United States Patent [19]

Güse et al.

[11] 3,923,752

[45] Dec. 2, 1975

[54] PRESSURE SENSITIVE ADHESIVES FROM DIESTERS OF FUMARIC ACID AND VINYL COMPOUNDS COPOLYMERIZABLE THEREWITH

[75] Inventors: Günter Guse; Hanns Georg Pietsch, both of Hamburg, Germany

[73] Assignee: Beiersdorf Aktiengesellschaft, Hamburg, Germany

[22] Filed: Oct. 9, 1974

[21] Appl. No.: 513,237

Related U.S. Application Data

[62] Division of Ser. No. 276,927, Aug. 1, 1972, Pat. No. 3,880,873, which is a division of Ser. No. 60,629, Aug. 3, 1970, Pat. No. 3,690,937.

[30] Foreign Application Priority Data

Aug. 8, 1969 Germany............................ 1940549

[52] U.S. Cl.......... 260/78.5 E; 117/76 A; 117/68.5; 117/122 PF; 117/161 UT; 260/77.5 CR; 260/73 R; 260/78.5 R; 260/78.5 T; 260/836; 260/844

[51] Int. Cl.²................... C08F 22/06; C08F 218/14

[58] Field of Search ... 276/927; 260/78.5 B, 78.5 E, 260/78.5 R, 78.5 T

[56] References Cited

UNITED STATES PATENTS

| | | | |
|---|---|---|---|
| 3,257,360 | 6/1966 | Slocombe | 260/78.5 E |
| 3,275,589 | 9/1966 | Alexander et al. | 260/78.5 E X |
| 3,532,708 | 10/1970 | Blance | 260/78.5 E X |
| 3,763,117 | 10/1973 | McKenna et al. | 260/78.5 E |
| 3,790,533 | 2/1974 | Samour | 260/78.5 R |

*Primary Examiner*—Lucille M. Phynes
*Attorney, Agent, or Firm*—Stevens, Davis, Miller & Mosher

[57] ABSTRACT

A pressure sensitive adhesive material is made by coating a substrate with a copolymer of specified proportions of a diester of fumaric acid, and a vinyl compound copolymerisable therewith as well as either or both of an olefinically unsaturated copolymerisable polar compound with carboxyl, carboxamide, dicarboxylic anhydride or dicarboximide groups, and an olefinically unsaturated copolymerisable compound with self-crosslinkable reactive groups, together with a cross-linking polyfunctional compound, and subjecting the coating thereon to a short period heat treatment.

1 Claim, No Drawings

PRESSURE SENSITIVE ADHESIVES FROM DIESTERS OF FUMARIC ACID AND VINYL COMPOUNDS COPOLYMERIZABLE THEREWITH

This is a division of application Ser. No. 276,927, filed Aug. 1, 1972, now U.S. Pat. No. 3,880,873 granted Apr. 29, 1975, which in turn is a division of Ser. No. 60,629, filed Aug. 3, 1970, now U.S. Pat. No. 3,690,937, granted Sept. 12, 1972.

This invention relates to a process for the manufacture of self adhesive tapes or foils having an adhesive which will adhere on pressure on the basis of copolymers of diesters of fumaric acid and vinyl compounds copolymerisable therewith.

It is known to use homo- or co-polymers of acrylic acid esters or copolymers of acrylic acid esters with other unsaturated monomers polymerisable therewith as pressure-sensitive adhesives for making self-adhesive materials of various types. Furthermore, pressure-sensitive adhesive coatings have been described of a copolymer resulting from copolymerisation of one or more acrylic acid esters with a small amount of a diester of fumaric acid, which contained 4 to 6 carbon atoms in the alcohol residue. The addition of the fumaric ester serves in this case to facilitate the temperature control during polymerisation and to reduce the cost of the end product. It also serves to modify the properties of the copolymer, e.g. for internal plasticisation. Such self-adhesive tapes or foils do not, however, come up to the elevated requirements which are required of them with respect to their adhesive power and cohesiveness, especially when they are destined for packing machinery.

A process for the manufacture of copolymers containing N-vinylpyrrolidone is also known, by the polymerisation of N-vinylpyrrolidones with esters of unsaturated dicarboxylic acids, wherein the molar ratio of N-vinylpyrrolidone to dicarboxylic acid ester is from 1 to 5:1. As dicarboxylic acid ester there may be used, for example, dialkyl maleates and substituted dialkyl maleates or dialkyl fumarates. The resulting copolymers can be used as adhesives for laminating foils of polyethylene, polyethyleneglycolterephthalate, vinyl chloride/vinylidene chloride copolymers, aluminium foils, wax- or kraft paper either to themselves or to others of the materials noted.

A copolymer made using di-2-ethylhexyl maleate and N-vinyl-2-pyrrolidone can be used to make a pressure sensitive hydrated cellulose adhesive tape, but such adhesive tapes do not have adhesive and cohesive properties sufficient for self-adhesive foils.

Finally, it is known to make a permanently tacky copolymer by polymerisation of 100 parts by weight of a monomer mixture of 30–40 parts by weight vinyl acetate and correspondingly 60–70 parts by weight of a monoalkyl ester of an α, β ethylenically unsaturated monocarboxylic acid or a dialkyl ester of an α, β ethylenically unsaturated dicarboxylic acid or mixtures of monoalkylesters and dialkylesters. There can be used for monoalkyl esters α, β unsaturated monocarboxylic acids with 3 to 5 carbon atoms, such as acrylic acid, methacrylic acid and crotonic acid, as for dialkyl esters, α, β unsaturated dicarboxylic acids with 4 to 5 carbon atoms, such as maleic acid, fumaric acid and itaconic acid. Each alkyl portion of the ester group should contain 7 to 12 carbon atoms.

The copolymers produced by this known process serve as permanently tacky adhesives, preferably in the form of a latex emulsion, for sticking difficulty adherable surfaces of polymers, such as of polyethylene, polypropylene and other highly hydrophobic polymers, to the same surfaces or to other material. For this, the adhesive in the adhesive join between the two stuck together surfaces should have a permanent tack.

The preferred application of these known copolymers thus lies in the area of permanent adhesion of large fabric surfaces (lamination of foils). Similarly, the known copolymers also find employment as pressure sensitive adhesives and separating coats. The known copolymers, however, do not constitute useable pressure sensitive adhesives for the manufacture of self adhesive tapes or foils, which as well as having a high adhesive power, have to have at the same time a sufficient internal strength.

The object of the invention is the manufacture of self-adhesive tapes or foils with a pressure sensitive adhesive which will adhere on contact, which satisfies the highest requirements concerning tack and quick stick, important especially in the use of self-adhesive tapes in fast-operating packing machinery, as well as concerning adhesive power on differing materials, including synthetic polymers, such as polyethylene and polyethyleneterephthalate, and which have self adhesive layers with exceptional properties adhering fast to the substrate, and which possess both high adhesive power and simultaneously good strength.

The process according to the invention for the manufacture of self-adhesive tapes or foils with an adhesive composition adhering on contact on the basis of copolymers of diesters of fumaric acid and vinyl compounds copolymerisable therewith is characterised in that an adhesive composition is taken on the basis of a copolymer which has been made by polymerisation of a monomer mixture of:

A. 50–80 weight % preferably 60–70 weight % (taken on the total weight of the monomers) diesters of fumaric acid with straight or branched chain saturated monovalent primary, secondary or tertiary aliphatic alcohols of 3 to 12 carbon atoms B. 18–40% by weight, preferably 25–35% by weight (taken on the total weight of the monomers) of vinyl compounds copolymerisable with the diesters of fumaric acid, such as vinyl esters of saturated aliphatic monocarboxylic acids, vinyl ethers, N-vinyl lactams, low acrylic or methacrylic acid esters or vinyl aromatic compounds, as well as either C. 0.5 to 15% by weight, preferably 2–8% by weight, especially about 4 to 5% by weight (taken on the total weight of the monomers) of olefinically unsaturated copolymerisable polar compounds with carboxyl, carboxamide, dicarboxylic anhydride or dicarboximide groups, or D. 0.1 to 10% by weight, preferably 0.5 – 5% by weight, especially about 1% by weight (taken on the total weight of the monomers) of olefinically unsaturated copolymerisable compounds with self-crosslinkable reactive groups, preferably those which contain hydroxy, epoxide, N-methylolamide, aldehyde or isocyanate groups, or both components (C) and (D), wherein for each of components (A) to (D) one or more components can be used, wherein to the adhesive composition is added from 0.1 to 10% by weight, preferably 0.5 to 5% by weight (taken on the copolymer) of a crosslinking active polyfunctional compound for copolymers of components (A), (B) and (C) and as required also for copolymers made using components (D), the adhesive is coated onto a substrate and finally subjected thereon to a short period heat treatment.

The copolymers according to the invention, which in the absence of solvents or thinners are tacky substances, can be used as self-crosslinkable adhesive compositions or as adhesive compositions crosslinkable by reactive additions. Thus, the invention also includes such copolymers of the composition given which attain the properties of good pressure-sensitive adhesive composition only after the resultant crosslinking on the substrate.

Suitable diesters of fumaric acid (component A) are, for example, di-isopropyl fumarate, di-n-butyl fumarate, di-sec-butyl fumarate, di-n-octyl fumarate, di-2-ethylhexyl fumarate or di-dodecyl fumarate. These can be used either alone or in admixture with one another.

The vinyl esters of saturated aliphatic monocarboxylic acids (component B) can consist, for example, of vinyl acetate or vinyl butyrate, wherein both a single vinyl ester and a mixture of several vinyl esters can be used. The vinyl ester can be partly or wholly replaced, according to the quantity used and in dependence on the amounts of components C and/or D chosen, by other vinyl compounds copolymerisable with the fumaric acid diesters, such as vinyl ethers, e.g. vinyl isobutylether, N-vinyl lactams, e.g. N-vinylpyrrolidone, lower acrylic or methacrylic acid esters, e.g. methyl methacrylate, or vinylaromatic compounds, e.g. styrene. In this case, they can be used either singly or in admixture with one another, and, in the case of only partial replacement of the vinyl ester, must be copolymerisable therewith. By the term "lower acrylic or methacrylic acid ester", there is meant especially esters of acrylic or methacrylic acid with monovalent aliphatic alcohols having 1 to 3 carbon atoms in the alcohol residue. For obtaining best results, lower acrylic or methacrylic acid esters and vinyl ethers should be present in an amount of at most 10% by weight of the total weight of the monomers in the monomer mixture, while the remainder of component B then consists of vinyl esters, N-vinyl lactams should, as sole component in place of the vinyl ester, be present in the monomer mixture in an amount of at most 23% by weight on the total weight of the monomers; in connexion with a vinyl ester, about up to half the added amount of vinyl ester. In place of or together with the noted vinyl compounds, small quantities of other suitable unsaturated compounds can be copolymerised with the fumaric acid esters. The amount of the monomers of component B used to copolymerise with the monomers of component A is dependent on the type, the reactivity and the compatability of the monomers.

Copolymers, which are made only by copolymerisation of monomers of component A with monomers of component B, show even in the solvent- or thinner-free condition certain pressure-sensitive adhesive properties, but generally do not have the necessary inner strength. In order to achieve this it is necessary to copolymerise monomer mixtures which apart from components A and B contain up to 15% by weight of component C, and/or up to 10% by weight of component D, taken on the total weight of the monomers.

The polymerised-in polar groups of component C enable crosslinking reactions of such copolymers with other reactive groups in the copolymer itself or with reactive polyfunctional compounds added thereto, and also raise the adhesion onto polar surfaces.

The class of monomers with polar groups includes, for example, monoesters of fumaric acid, maleic acid or itaconic acid with monovalent saturated aliphatic alcohols with 1 to 8 carbon atoms, and also crotonic acid, itaconic acid, methyleneglutaric acid, maleic acid anhydride or maleic acid imide, which likewise can be polymerised in singly or in a mixture with one another.

In order to obtain self-crosslinking copolymers, the monomer mixture should contain such unsaturated copolymerisable monomers which, as well as the olefinic double bond, have one or more reactive groupings in the molecule (component D) which are thus able to react with the polar groups of the monomers of component C or with one another. Preferably as copolymerisable monomers of component D, compounds are used which contain hydroxy, epoxy, N-methylolamide, aldehyde or isocyanate groups. Examples of this type of monomer are: hydroxyalkyl esters or glycidyl esters of acrylic or methacrylic acid, N-methylolacrylamide, acrolein and isocyanatoalkylacrylates and methacrylates. These monomers also may be polymerised in singly or in admixture. The quantity of the optionally useable monomers with reactive groups in the molecule (component C and/or D) for copolymerisation with the monomers of components A and B is dependent upon the type and reactivity of the monomers, which in turn is dependent on the number of reactive groups in the molecule.

The crosslinking of the copolymer on the substrate can result either by self-crosslinking (combination ABD or ABCD) — if necessary with the aid of a crosslinking catalyst — or with the aid of a polyfunctional compound added to the copolymer before coating onto the substrate, wherein in both cases temperatures between 50° and 150°C are to be maintained.

The manufacture of the pressure sensitive adhesive copolymers according to the invention can take place by the known methods of mass, solution or emulsion polymerisation, but is preferably carried out by "dilution polymerisation". This dilution polymerisation is a variant of mass polymerisation in which the monomer mixture is first polymerised without the addition of solvents to a high viscosity and is then, if necessary several times, diluted. The copolymerisation is as usual carried out under a protective gas atmosphere and started with radical initiators, e.g. by using organic peroxides or azo compounds such as dibenzoyl peroxide, di-tert-butyl peroxide or $\alpha, \alpha'$- azo diiso- butyronitrile in mass, solution or dilution polymerisation, or watersoluble initiators, such as potassium persulphate, in emulsion polymerisation. As well as this, further polymerisation aids such as control agents, chain transfer agents and, in the case of emulsion polymerisation, emulsifiers, protective colloids, buffering agents and thickening agents can be used. The K-value of Fikentscher ("Cellulose-Chemie", 13 (1932) page 58) serves as a measure of the molecule size obtained by the copolymerisation. It is determined by measuring the viscosity of a 1% solution of the copolymer in a suitable organic solvent, e.g. toluene, at 20°C.

The K-values of copolymers according to the invention lie — according in each case to the polymerisation process and conditions — in the range 20 to 80, preferably about 30 to 70.

Before bringing onto the substrate, the copolymers or solutions, dispersions or emulsions thereof, can be mixed with additives, each according to its composition for further reaction (crosslinking) on the substrate. These additives can consist of a catalyst and/or of one or more polyfunctional compounds.

As catalysts there may be used metal compounds, such as zinc chloride or acids, such as p-toluene sulphonic acid or octyl phosphoric acid, in amounts of up to about 1% taken on the copolymer. The catalyst can be added as such or dissolved in water or an organic solvent to the copolymer.

As polyfunctional compounds, which are able to react with reactive groups of the copolymer, for example with carboxyl, hydroxyl, epoxy, N-methylolamide, aldehyde or isocyanate groups, for the process according to the invention compounds are preferably used which have two or more reactive epoxy or isocyanate groups in the molecule, or reactive thermosetting phenol resins. The amount to be used in each case depends on the type of polyfunctional compound chosen and must be matched in type and quantity to the reactive groups polymerised in the copolymer. It should not, however, generally exceed 10% (taken on the copolymer or the solids content of the copolymer solution or dispersion). Catalysts can advantageously be employed even when using polyfunctional compounds.

In order to obtain special effects, there can further be added to the coating composition, in small quantity, adhesive resins, fillers, plasticisers, dyes or pigments. The use of plasticisers is especially to be recommended if the proportion of component B lies at the upper limit of the range given, or if the adhesive tapes made using the copolymers of the invention are to be used at low temperatures.

The coating of the substrate with the copolymer or its solution, dispersion or emulsion can take place by normal coating devices on one or both sides, for example by doctoring, dip coating, trailing blade coating, bar coating or roller coating.

As substrates, there can be used foils of plastics or modified natural materials, paper, woven materials of all types, fleece materials, or fleecelike sheet fabrics, as well as metal foils, metallised plastics foils, asbestos and glass fibre cloths, foams or the like. If necessary, the substrate can be provided with an adhesion promoting interlayer.

The coated substrate is subjected to a short-period heat treatment to remove the solvent and to crosslink the copolymer, in which it is heated for up to 15 minutes at a temperature between 50° and 150°C, preferably between 70° and 130°C. The period of the heat treatment may be shorter, the higher the temperature chosen.

The self-adhesive tapes or foils so obtained can after cooling be slit to the required width and put on the market rolled up into rolls. For facilitating unrolling, the rear side of the substrate may be provided with an antiadhesive coating or the adhesive side of the substrate may be provided with a covering material which is made adhesive repellent.

A further possible method of carrying out the process of the invention consists in coating the copolymer or a solution, dispersion or emulsion thereof onto a heated drum or endless steel belt, drying it on this intermediate carrier, partly or fully crosslinking it and then transferring it onto the substrate, such as, for example, fleece material or very porous paper, whereon the necessary full crosslinking of the copolymer in combination with the final substrate by means of a short heat impulse.

The advantages of copolymers of the present invention over other types of copolymers known for use for the same purpose, for example, those types on the basis of acrylic acid esters, consist, inter alia, in an easing of the manufacturing conditions and in an especially advantageous workability. The low polymerisation tendency of fumarates — compared with acrylates — facilitates the temperature control during polymerisation in the manufacture of the copolymers, so that for example in the use of fumarates as an essential component of the monomer mixture to be polymerized, a mass polymerisation without notable heat of reaction can be carried out. Compared to previously known pressure sensitive adhesive copolymers, important advantages also arise in the processing of the copolymers according to the invention in that, on account of their relatively low viscosity, it is possible to manufacture copolymer solutions or dispersions with a high solids content, and in the limiting case even solvent-free pressure-sensitive adhesive copolymers, and to use these to coat substrates. From this, substantial savings in solvent and acceleration of the drying process are obtained.

In this fashion, exceptional pressure sensitive adhesive tapes and foils are obtained, the adhesive layers of which possess all the characteristic properties of a good pressure sensitive adhesive. They are as follows:

a. high contact tackiness, which exceeds that of comparable pressure-sensitive adhesives on the basis of other copolymers, such as those of acrylic acid esters.

b. high adhesive power to various materials, inter alia to metals, glass, paper, cloths, synthetic polymers of polar and non-polar type, e.g. on polyethylene and polyethylene terephthalate surfaces, wherein this adhesive power likewise exceeds that of the comparable acrylic acid ester copolymers.

c. a good inner strength, sufficient for the most varied applications, even at high temperature, this cohesion of the pressure-sensitive adhesive layer being able to be increased for extreme specifications concerning hot strength by the addition of larger quantities of polyfunctional compounds or by further heat treatment at higher temperature.

Tackiness and adhesive power of pressure sensitive adhesive compositions according to the invention can be shown by the following test:

A foil is coated, for example a foil of polyethylene terephthalate, with a copolymer manufactured according to the invention, in such a way that after drying, a coating weight of only 12 gm/m$^2$ is obtained. A strip of the adhesive sheet so obtained is adhered under substantial pressure to a sheet of hard sized paper such as an index card. Directly thereafter, if one tries to pull the strip away again, the paper is split; with comparable pressure sensitive adhesive materials on the basis of other polymers or copolymers, e.g. those of acrylic acid esters, this effect is not obtained, and in those cases, the pressure sensitive adhesive material separates from the paper surface on pulling the strip away.

The following examples will serve to illustrate the invention:

EXAMPLE 1

| | Parts by Weight |
|---|---|
| di-2-ethyl hexyl fumarate (A) | 64.0 |
| vinyl acetate (B) | 30.0 |
| monoisopropyl fumarate (C) | 5.0 |
| glycidyl methacrylate (D) | 1.0 |
| acetone | 13.3 |

| | Parts by Weight |
|---|---|
| petrol (boiling range 30–85°C) | 53.4 |

In order to make the copolymer, the monomer mixture was placed in a vessel of glass or stainless steel which was provided with a stirrer, reflux condenser, thermometer and nitrogen feed (a gas inlet tube), and which could be heated in a waterbath, oilbath or steambath. The mixture of monomers was dissolved in the mixture of acetone and benzene noted, and the mixture obtained saturated with nitrogen while stirring and warmed to the reflux temperature (48°C). 0.2 parts by weight of dibenzoyl peroxide (75% in water) dissolved in a little acetone, were then added as initiator. The viscosity of the solution gradually increases during the continued refluxing. After 11, 13 and 14 hours reflux, calculated from the point of introduction of the initiator, the solution was diluted, each time with 35 parts by weight petrol of boiling range 60° to 95°C. After a total reaction time of 15 hours, the solution had a copolymer content (solids content) of 34.6% by weight. The K-value of the so produced copolymer was 67.4, measured on a 1% solution of the copolymer in toluene at 20°C.

For carrying out the K-value determination, the solution of the copolymer obtained as described was painted in a thin layer onto a paper strip provided with an anti-adhesive coating (release paper), dried at room temperature and finally dissolved in the required quantity of toluene to give a 1% solution.

The viscous solution of the copolymer was coated, using a conventional coating apparatus, onto a polyethylene terephthalate foil 0.25 mm thick. Thereafter, the coated foil was passed through a heated drying channel and dried for 5 minutes at high temperature to drive off the solvent. Thereby, a simultaneous self-crosslinking of the copolymer took place, as the values in the following table shows:

| | Drying Temperature | | |
|---|---|---|---|
| | 70°C | 100°C | 130°C |
| coating weight gm/m² | 28.4 | 28.1 | 28.1 |
| adhesive power gm weight/cm | 499 | 464 | 431 |
| holding power at 50°C (min) | >257 | 913 | >1100 |
| holding power at 100°C (min) | 12 | 33 | 1128 |

The values given in the table were determined after at least 24 hours storage of the tapes or foils.

The coating weight was determined by weighing identical sized pieces of uncoated and coated substrate material, and expressing the results in gm per square meter.

For measuring the adhesive power, 10 to 20 mm wide strips of the adhesive foil were adhered under light pressure to sheets of polished and degreased stainless steel and rolled over to and fro with a weighted roller (2 cm bandwidth, speed 10 meters/minute) 5 times. The test strips were pulled away from the steel sheet in a tensile test machine and the values given by that given in grams weight per centimeter (pull off angle 180°, pull off speed 30 cm/minute).

For testing the heat resistance, or holding power, a 5 × 3 cm by 1 mm thick steel plate was polished in the long direction with emery paper and cleaned with hot petrol and toluene. A wide adhesive tape about 15 cm long and 2 cm wide was so adhered to the polished and degreased surface of the steel plate, that taken from the edge of one smaller side, a length of 2.54 cm lay on the steel plate. The stuck-on portion of the tape was then pressed on by one to and fro rolling with a 2 kg weight roller. The free end of the strip was now hung up vertically and loaded with an 800 gm weight thereon (400 gm/cm). The test was carried out at various temperatures (50°C and 100°C) and the time for falling off of the strip (and weight) measured in minutes.

As is evident from the table, the holding power rises strongly with the drying temperature.

EXAMPLE 2

| | | Parts by Weight |
|---|---|---|
| Di-2-ethylhexyl fumarate | (A) | 68.0 |
| vinyl acetate | (B) | 30.0 |
| 4-hydroxybutyl acrylate | (D) | 2.0 |
| acetone | | 13.3 |
| petrol (boiling range 30 to 85°C) | | 53.4 |

To manufacture the copolymer, the monomer mixture was dissolved in the solvent mixture, as described in Example 1, and the resultant solution saturated with nitrogen and warmed to reflux temperature (53°C). 0.3 parts by weight of dibenzoylperoxide (75% in water), diluted in a little acetone, were added as initiator. On continued warming at reflux temperature, the viscosity of the solution gradually increased. After 3½ and 6½ hours, starting from the addition of the initiator, the solution was diluted each time with 35 parts by weight of petrol (boiling range 60° to 95°C). After a total reaction time of 11 hours, the solution so made of the copolymer had a solids content (polymer content) of 50.3% by weight. The K-value of the copolymer amounted to 39.9 (measured in toluene at 20°C).

This solution of the copolymer was coated onto a 0.025 mm thick foil of polyethylene terephthalate and dried for 5 minutes at 70°C. This pressure-sensitive adhesive foil showed in the dried uncrosslinked state as unusually high adhesive power, but, for certain areas of use, insufficient holding power. By the addition of a small quantity of a triisocyanate as a polyfunctional compound to the solution of copolymer, a crosslinking during drying at 70°C can take place after coating onto the substrate. For this, there was used as triisocyanate, the addition product of 3 mols toluene diisocyanate with 1 mol of 1,1,1-trimethylolpropane in the form of a 37.5% solution in ethyl acetate. The quantities given in the following table are based on this solution, calculated on the solids content

| | without crosslinking agent | with 1% triisocyanate | with 2% triisocyanate |
|---|---|---|---|
| coating weight (g/m²) | 22.1 | 25.8 | 22.1 |
| adhesive power (gm wt./cm) | 739 | 497 | 367 |
| holding power at 50°C (min) | 3 | 245 | 336 |

|  | without crosslinking agent | with 1% triisocyanate | with 2% triisocyanate |
| --- | --- | --- | --- |
| holding power at 100°C (min) | 2 | 17 | 26 |

If the same solution of the copolymer, mixed with 1% of the triisocyanate solution, was coated at greater thickness onto a polyvinyl chloride foil of 0.2 mm thickness and dried for 5 minutes at 70°C, the following values were measured:

| | |
| --- | --- |
| coating weight | 54.8 gm/m² |
| adhesive power | 2101 gm. wt./cm |
| holding power at 50°C | 133 minutes |
| holding power at 100°C | 35 minutes |

EXAMPLE 3

|  | parts by weight |
| --- | --- |
| di-2-ethylhexyl fumarate (A) | 60.0 |
| vinyl acetate (B) | 30.0 |
| mono-2-ethylhexyl fumarate (C) | 10.0 |

The monomer mixture was saturated with nitrogen without addition of solvents and warmed to 70°C, 0.1 parts by weight benzoyl peroxide (75% in water) dissolved in a little acetone, were added as initiator. The viscosity of the reaction mixture rapidly rose. After 3½ and 6½ hours, taken from the time of adding the initiator, the reaction mixture was diluted each time by 35 parts by weight of petrol (boiling range 60°–95°C). After a total reaction of time of 15 hours, the solution of the copolymer has a solids content of 59.2% by weight. The K-value of the copolymer amounted to 50.1 (measured in toluene at 20°C).

This solution of the copolymer was diluted further with petrol to a solids content of 25–30% by weight and a cycloaliphatic diepoxide (Union Carbide Corporations ERL-4289) was added in an amount of 5 or 8% taken on the solids content, and the solution then coated in conventional fashion onto a polyethylene terephthalate foil 0.025 mm thick, and dried in each case for 5 minuted at an elevated temperature of 100° and 130°C. Pressure sensitive adhesive foils with the following properties were obtained:

If there is added to the solution prior to coating on the substrate, as well as 5% by weight diepoxide, additionally 0.3% of a triisocyanate (as in Example 2), then after coating strong crosslinking is already obtainable at a temperature of 70°C.

| | 5% by weight diepoxide +0.3% by weight triisocyanate |
| --- | --- |
| coating weight g/m² | 23.2 |
| adhesive power gmwt./cm | 471 |
| holding power at 50°C min | >1138 |
| holding power at 100°C min | >1138 |

EXAMPLE 4

|  | parts by weight |
| --- | --- |
| di-2-ethylhexyl fumarate (A) | 71.0 |
| vinyl acetate (B) | 25.0 |
| mono-n-butyl-maleinate (C) | 4.0 |

The monomer mixture, without addition of solvents, was saturated with nitrogen and warmed to 78°C. 0.3 parts by weight of dibenzoyl peroxide (75% in water) diluted in a little acetone, were added as initiator. On continued heating of the reaction mixture at 78°C, the viscosity rapidly rose. After 2½, 4 and 14½ hours, taken from the time of adding the initiator, the mixture was each time diluted with 35 parts by weight of petrol (boiling range 60°–95°C). After a total reaction time of 15 hours, the solution of copolymer had a solids content of (polymer content) of 46.1%. The K-value of the copolymer amounted to 47.1 (measured in toluene at 20°C).

This highly viscous solution was diluted further with petrol to a coatable consistency, provided at the same time with further additives and coated on the carrier material (see following table). As components mixed in there were used an epoxy resin (a cycloaliphatic diepoxide; Union Carbide Corporation's ERL-4289) as

|  | 5% by weight diepoxide | | 8% by weight diepoxide | |
| --- | --- | --- | --- | --- |
| Drying temperature (°C) | 100 | 130 | 100 | 130 |
| coating weight (g/m²) | 27.1 | 27.1 | 28.7 | 28.7 |
| adhesive power (gm.wt./cm) | 611 | 552 | 627 | 589 |
| holding power at 50°C (min) | >4070 | >4070 | >3985 | >3970 |
| holding power at 100°C (min) | 13 | >4070 | 52 | >3997 | polyfunctional compound and zinc chloride as crosslinking catalyst. The following values were measured.

| Addition | Carrier | Coating weight (g/m²) | Drying | | Adhesive power (gm.wt/cm) | Holding power (min) at 50°C | at 100°C |
| --- | --- | --- | --- | --- | --- | --- | --- |
| none | polyethylene terephthalate 25 micron | 30.6 | 5 min | 70°C | 537 | 11 | 3 |
| 10% Diepoxide + 0.5% ZnCl₂ | ″ | 28.0 | 5 min | 100°C | 337 | >1276 | >1279 |
| 5% Diepoxide + 0.4% ZnCl₂ | polyvinyl-chloride 200 micron | 55.5 | 10 min | 70°C | 1360 | 28 | 13** |

| Addition | Carrier | Coating weight (g/m²) | Drying | Adhesive power (gm.wt/cm) | Holding power (min) at 50°C | at 100°C |
|---|---|---|---|---|---|---|
| 7.5% Diepoxide + 2% ZnCl₂ | Kraft paper 100 g/m² | 26.8 | 5 min 100°C | 300 | >90 | >90 |
| '' | Plastics coated cotton cloth++ | 92.5 | 5 min 100°C | 207 | 8 | 4 |
| '' | Hard polyvinylchloride 100 micron | 46.3 | 5 min 70°C | 365 | >90 | not measured |
| '' | Aluminium foil 40 micron | 41.0 | 5 min 100°C | 251 | >90 | >90 |

++The coating took place using an aqueous plastics dispersion of a copolymer on the basis of an acrylic acid ester ("Acronal D", BASF)
**at 70°C

EXAMPLE 5

| | | Parts by weight |
|---|---|---|
| di-2-ethylhexyl fumarate | (A) | 62.0 |
| vinyl acetate | (B) | 30.0 |
| 4-hydroxybutyl acrylate | (D) | 8.0 |
| acetone | | 13.3 |
| petrol (boiling range 30–85°C) | | 53.4 |

The monomer mixture was dissolved in the mixture of petrol and acetone, the solution saturated with nitrogen and heated to reflux temperature (50°C). 0.3 parts by weight dibenzoyl peroxide (75% in water) dissolved in a little acetone, were then added as initiator. During the continued heating the viscosity rose gradually. After 6, 8, 11 and 14½ hours, taken from the introduction of the initiator, the solution was diluted each time with 35 parts by weight petrol (boiling range 60°–95°C). After a total reaction time of 15 hours., the solution had a solids content (polymer content) of 27.2%. The K-value of the copolymer amounted to 51.8 (measured in ethyl acetate at 20°C).

The viscous solution of the copolymer was coated onto a foil of polyethylene terephthalate and dried for 5 minutes at 70°C. The so manufactured pressure sensitive adhesive foil had in the uncrosslinked condition, an unusually high adhesive power. Its holding power at elevated temperature could be further improved by crosslinking with a triisocyanate (as in Example 2), as is evident from the following data:

| | without crosslinking agent | with 4% triisocyanate |
|---|---|---|
| coating weight (gm/m²) | 23.8 | 24.4 |
| adhesive power (gm.wt/cm) | 773 | 348 |
| holding power at 50°C (min) | 8 | 46 |
| holding power at 100°C (min) | 3 | 17 |

EXAMPLE 6

| | Parts by weight |
|---|---|
| di-2-ethylhexyl fumarate (A) | 420.0 (70%) |
| vinyl acetate (B) | 150.0 (25%) |
| crotonic acid (C) | 24.0 (4%) |
| N-methylolacrylamide (60% in water) (D) | 6.0 (1%) |

After addition of 1.8 parts by weight of tetrabromomethane, the monomer mixture was saturated with nitrogen, brought to reaction temperature (about 65°C) and treated with 6 parts by weight dibenzoyl peroxide (75% in water) as initiator. Polymerisation took place without noticeable heat of reaction. After 5 hours polymerisation at about 65°C, the reaction was interrupted. The copolymer still had a paintable consistency. The polymer content amounted to 83 to 88%, the K-value was at 30 (measured in toluene at 20°C).

The solvent free copolymer obtained was, after the addition of zinc chloride (in the form of a concentrated solution in ethyl acetate or isopropanol) coated onto a 0.025 mm thick polyethylene terephthalate foil and then crosslinked on the substrate by a subsequent heat treatment (5 minutes at 120°C).

The following values relative to the pressure sensitive adhesive properties were determined:

| | % zinc chloride (taken on the copolymer) | |
|---|---|---|
| | 0.5 | 1.0 |
| coating weight (gm/m²) | 32.4 | 30.9 |
| adhesive power (gm.wt./cm) | 455 | 300 |
| holding power at 50°C (min) | >1100 | >1100 |
| holding power at 100°C (min) | 32 | 52 |

EXAMPLE 7

| | Parts by weight |
|---|---|
| di-sec-butyl fumarate (A) | 25.0 |
| di-2-ethylhexyl fumarate (A) | 40.0 |
| vinyl acetate (B) | 30.0 |
| monoisopropyl fumarate (C) | 5.0 |
| glycidyl methacrylate (D) | 1.0 |
| acetone | 13.4 |
| petrol (boiling range 30 to 85°C) | 53.3 |

The monomer mixture was dissolved in the mixture of petrol and acetone, the solution saturated with nitrogen and warmed to the reaction temperature (reflux temperature of the solution) (43°C) 0.3 parts by weight of dibenzoyl peroxide (75% in water) dissolved in a little acetone, were added as initiator. The viscosity of the solution slowly rose driving the polymerication process. After 16, 18 and 20 hours, taken from the time of addition of the initiator, the thickening solution was diluted with a total of 85 parts by weight petrol (boiling range 60°–95°C). After a total reaction time of 22 hours, the solution had a polymer content of 42.3%. The K-value of the copolymer amounted to 51.9 (measured in toluene at 20°C).

The viscous solution of the copolymer obtained was coated onto a polyethylene terephthalate foil and dried thereon for 5 minutes at 70°C with simultaneous crosslinking. After 24 hours storage of this pressure sensitive adhesive foil, the following values were measured:

| | |
|---|---|
| coating weight | 24.9 gm/m$^2$ |
| adhesive power | 478 gm.wt/cm |
| holding power at 50°C | 61 minutes |
| holding power at 100°C | 12 minutes |

EXAMPLE 8

| | parts by weight |
|---|---|
| di-lauryl fumarate (A) | 60.0 |
| vinyl acetate (B) | 30.0 |
| mono-2-ethylhexyl fumarate (C) | 10.0 |
| glycidyl methacrylate (D) | 1.0 |
| acetone | 13.4 |
| petrol (boiling range 60–95°C) | 53.3 |

The monomer mixture was dissolved in the mixture of petrol and acetone, the solution saturated with nitrogen and heated to reaction temperature. (reflux temperature of the solvent mixture) (60°C) 0.2 parts by weight of dibenzoyl peroxide (75% in water) dissolved in a little acetone, were added as initiator. The viscosity of the solution slowly increased during the polymerisation process. After 10, 12 and 14 hours taken from the time of adding the initiator, the solution was dibuted each time with 35 parts by weight of petrol (boiling range 60°–95°). After a total reaction time of 15 hours the resulting solution had a polymer content (solids content) of 32.2) The K-value of the copolymer amounted to 47.5 (measured in toluene at 20°C).

The viscous solution of the copolymer obtained was coated onto a polyethylene terephthalate foil and subsequently dried for 5 minutes at 70°C with simultaneous self-crosslinking. After 24 hours storage, the adhesive foil showed the following values:

| | |
|---|---|
| coating weight | 20.5 gm/m$^2$ |
| adhesive power | 358 gm.wt/cm |
| holding power at 50°C | 76 minutes |
| holding power at 100°C | 13 minutes |

EXAMPLE 9

| | Parts by weight | |
|---|---|---|
| di-2-ethylhexyl fumarate (A) | 130.0 | (65%) |
| vinyl acetate (B) | 60.0 | (30%) |
| maleic acid anhydride (C) | 8.0 | (4%) |
| N-methylolacrylamide (60% in water) (D) | 2.0 | (1%) |

The monomer mixture was saturated with nitrogen, heated to about 70°C and treated with 0.4 parts by weight dibenzoyl peroxide (75% in water). The reaction proceeded without noticeable heat of reaction. Parallel with the increase of the viscosity, the reaction mixture was diluted during the polymerisation process, after 4½ hours taken from adding the initiator with 50 parts by weight ethyl acetate, after 6 hours with 50 parts by weight isopropanol and after 16 hours with 100 parts by weight petrol (boiling range 60°–95°C). Additionally, after about 6 hours, taken from the addition of the initiator, 0.6 parts by weight of dibenzoyl peroxide (75% in water) were added. On expiry of about 22 hours, the polymerisation carried out at about 70°C was interrupted.

The copolymer solution obtained had a solids content of about 50% the K-value of the copolymer amounted to 40 (measured in toluene at 20°C).

The solution of copolymer was coated onto a foil of polyethylene terephthalate 0.025 mm thick and dried for 5 minutes at 70°C. Parts of this solution were mixed with a) 5% by weight kaolin and b) 5% by weight titanium dioxide in order to obtain a white pigmented adhesive layer, and coated onto polyethylene terephthalate and dried as described above. The following values were obtained.

| | Mixture taken on solids content (copolymer content) | | |
|---|---|---|---|
| | None | 5% Kaolin | 5% titanium dioxide |
| coating weight (gm/m$^2$) | 49.7 | 59.4 | 40.1 |
| adhesive power(gm.wt/cm) | 475 | 490 | 370 |
| holding power at 50°C (min) | 23 | 14 | 32 |
| holding power at 100°C (min) | 6 | 3 | 3 |

EXAMPLE 10

| | parts by weight) |
|---|---|
| di-2-ethylhexyl fumarate (A) | 55 |
| di isopropyl fumarate (A) | 10 |
| vinyl acetate (B) | 30 |
| mono-isopropyl fumarate (C) | 5 |

The monomer mixture was saturated with nitrogen, heated to 78°C and reacted with 0.3 parts by weight dibenzoyl peroxide (75% in water). The viscosity increased relatively rapidly. After 1 hour and 13 hours, taken from the time of adding the initiator, the mixture was diluted each time with 40 parts by weight acetone. After a total reaction time of 13½ hours, the resulting copolymer solution had a solids content of 43.9%. The K-value of the copolymer amounted to 45.7 (measured in toluene at 20°C).

The viscous solution was further diluted with acetone to a solids content of 40%, simultaneously mixed with 10% epoxy resin (ERL 4289) and coated onto a polyethylene terephthalate foil (25 microns). The following values were measured:

| | Drying 5 minutes at 70°C | Drying 5 minutes at 130°C |
|---|---|---|
| coating weight (gm/m$^2$) | 30.8 | 30.8 |
| adhesive power (gm.wt/cm) | 380 | 340 |
| holding power at 50°C (minutes) | 28 | >1270 |

|  | Drying 5 minutes at 70°C | Drying 5 minutes at 130°C |
|---|---|---|
| -continued | | |
| holding power at 100°C (minutes) | 7 | 35 |

EXAMPLE 11

|  | Parts by weight |
|---|---|
| di-2-ethylhexyl fumarate (A) | 97.5 (65%) |
| styrene (B) | 45.0 (30%) |
| monoisopropyl fumarate (C) | 7.5 (5%) |

The monomer mixture was saturated with nitrogen, heated at 78°C and reacted with 0.75 parts by weight dibenzoyl peroxide (75% in water). After 12 hours, taken from the time of addition of the initiator, the solution was diluted with 40 parts by weight acetone, and half an hour later with 120 parts by weight benzene (boiling range 60° to 95°C). The polymer solution produced had a solids content of 48.5%. The K-value of the copolymer was 28.9, measured in toluene at 20°C.

The viscous solution was coated onto a 25 micron polyethylene terephthalate foil and dried at 70°C for 5 minutes. At a coating weight of 29 gm/m², a high adhesive power was evident (610 gm.wt./cm), but also an insufficient cohesion for some purposes. By mixing with 10% by weight epoxy resin (ERL-4289) and 1% by weight zinc chloride, the cohesion of the composition could be greatly increased.

The pressure sensitive adhesive with the just noted additions can be used with especial advantage for coating self-adhesive labels. A label paper (85 gm/m²) was coated by a transfer process (Drying 5 minutes at 130°C on silicone paper and then transferred): the following values were measured:
coating weight 50.3 gm/m²
adhesive power: very high — not measureable since on pulling away, the paper split.
holding power at 50°C 31 minutes
holding power at 100°C 6 minutes.

We claim as our invention:

1. A pressure-sensitive adhesive material of an adhesive composition adhering on contact which comprises a copolymer formed from the polymerization of a monomer mixture of (A) 50–80% by weight, based on the total weight of the monomers, of at least one diester of fumaric acid and a saturated monovalent aliphatic alcohol containing from 3 to 12 carbon atoms; (B) 18–40% by weight, based on the total weight of the monomers, of at least one vinyl ester of a saturated aliphatic monocarboxylic acid copolymerizable with (A); (C) from 0.5 to 15% by weight, based on the total weight of the monomers, of maleic acid anhydride having a polar group copolymerizable with (A) and (B), and (D) from 0.1 to 10% by weight, based on the total weight of the monomers, of N-methylolacrylamide copolymerizable with (A), (B) and (C), said compound having a self cross-linkable N-methylolamide group, said group of (D) being at least partially cross-linked.

* * * * *

UNITED STATES PATENT AND TRADEMARK OFFICE
CERTIFICATE OF CORRECTION

PATENT NO. : 3,923,752
DATED : December 2, 1975
INVENTOR(S) : Gunter GUSE et al

It is certified that error appears in the above-identified patent and that said Letters Patent are hereby corrected as shown below:

[62], line 2, change "3,880,873" to -- 3,880,813 --

Column 1, line 7, change "3,880,873" to -- 3,880,813 --

Column 3, line 55, change "patability" to -- patibility --

Column 5, line 68, after "impulse" insert -- is carried out --

Column 13, line 35, change "dibuted" to -- diluted --

Column 13, line 39, change "32.2)" to -- 32.2% --.

Signed and Sealed this

Twenty-fourth Day of October 1978

[SEAL]

Attest:

RUTH C. MASON
*Attesting Officer*

DONALD W. BANNER
*Commissioner of Patents and Trademarks*